United States Patent Office.

JOHN FULLAGAR AND MILES BYRNE, OF NEW YORK, N. Y.

*Letters Patent No. 91,223, dated June 15, 1869.*

IMPROVED COMPOSITION-CEMENT FOR SETTING SLATES, MAKING GUTTERS, &c.

The Schedule referred to in these Letters Patent and making part of the same.

*To all whom it may concern:*

Be it known that we, JOHN FULLAGAR and MILES BYRNE, both of the city and State of New York, have invented a new and useful composition of matter, which we call "Composition-Cement," for resisting both heat and moisture; and we do hereby declare that the following is a full and exact description thereof.

The nature of our invention consists in combining coal-tar, shell, or air-slaked lime, fine sand, and coke-dust, or the carbonized debris or dust of furnaces, in proper proportions, to form a new composition or cement, of great strength and durability, useful for bedding or rendering slates, and for copings; also, for building up the furnaces of gas-retorts, and other works of like nature, which are subjected to great heat, and liable to rapid disintegration, where the mortar and cements of common use are employed; also, for the laying of wood pavements, and work of like nature.

To enable others skilled in the art to make and use our invention, we will proceed to describe its composition.

Take one part shell, or air-slaked lime, two parts fine sand, three parts of fine carbon-dust, and two parts coal-tar. Thoroughly incorporate and mix.

This composition is adapted for the bedding of slate, for copings, and for furnaces, but the proportions may be varied to suit certain conditions of work, temperature, or weather, as experience may suggest.

For cisterns, water-tanks, and the like, take two parts lime, two parts sand, three parts carbon-dust, three to four parts coal-tar. These proportions may also be changed, as above stated.

Having thus described our invention,

What we desire to claim, and secure by Letters Patent of the United States, is—

The use of fine sand, lime, coal-tar, in combination with fine coke-dust, carbon-dust, or sweepings of furnaces and retort-benches, to form a cement.

JOHN FULLAGAR.
MILES BYRNE.

Witnesses:
CHARLES D. INGERSOLL,
JOHN PINGRY.